United States Patent [19]

Yamaguchi

[11] Patent Number: 5,050,453

[45] Date of Patent: Sep. 24, 1991

[54] COMPENSATION FOR A DROP IN IDLING SPEED UPON SELECTING DRIVE RANGE FROM NEUTRAL RANGE

[75] Inventor: Hiroshi Yamaguchi, Yokohama, Japan

[73] Assignee: Nissan Motor Co., Ltd., Yokohama, Japan

[21] Appl. No.: 390,908

[22] Filed: Aug. 8, 1989

[30] Foreign Application Priority Data

Aug. 8, 1988 [JP] Japan .................................. 63-196079

[51] Int. Cl.⁵ ....................... F16H 59/68; F16H 59/74
[52] U.S. Cl. ........................................ 74/858; 74/856; 74/861
[58] Field of Search .................. 74/851, 858, 859, 873, 74/874, 872, 857, 860, 866

[56] References Cited

U.S. PATENT DOCUMENTS

| | | | |
|---|---|---|---|
| 4,289,100 | 9/1981 | Kinugawa et al. | 74/860 X |
| 4,344,399 | 8/1982 | Matsumura et al. | 364/431.1 |
| 4,355,550 | 10/1982 | Will et al. | 74/858 X |
| 4,628,774 | 12/1986 | Iwanaga | 74/867 |
| 4,680,992 | 7/1987 | Hayasaki et al. | 74/869 |
| 4,747,379 | 5/1988 | Oba | 364/431.1 |
| 4,750,386 | 6/1988 | Bowers et al. | 74/873 |
| 4,760,823 | 8/1988 | Yasuoka et al. | 74/860 X |
| 4,819,596 | 4/1989 | Yasuoka et al. | 74/860 X |
| 4,898,049 | 2/1990 | Niikura | 74/866 |

FOREIGN PATENT DOCUMENTS 0206091 12/1986 European Pat. Off. .

*Primary Examiner*—Allan D. Herrmann
*Assistant Examiner*—Khoi Q. Ta
*Attorney, Agent, or Firm*—Foley & Lardner

[57] ABSTRACT

A closed-loop system for compensating for an undesired drop in idling speed upon manually shifting a manual valve from a neutral range position to a drive range position include detecting the instance when a start-up friction element is brought into engagement after the above-mentioned range select operation. The engine torque is increased in response to a torque-up command signal generated at the instance directed detected.

8 Claims, 5 Drawing Sheets

COMPENSATION FOR A DROP IN IDLING SPEED UPON SELECTING DRIVE RANGE FROM NEUTRAL RANGE

BACKGROUND OF THE INVENTION

The present invention relates to a system for compensating for a drop in idling speed of an engine taking place when the engine starts to be subjected to load after a manual valve has been shifted from a neutral range position to one of a plurality of drive range positions.

An automatic transmission is known which stays in a neutral state when a driver places a manual valve at a neutral range ("N" range) position or a parking range ("P" range) position. When the driver shifts the manual valve at one of drive range positions including an automatic drive range ("D" range), at least one manual drive range, and a reverse drive range, the automatic transmission shifts to a torque transmission state where at least one of friction elements is engaged to establish a power delivery path.

With the vehicle at a standstill, if the driver shifts the manual valve from the neutral range position to the drive range position, a start-up friction element adapted to be engaged to establish a power delivery path for the first gear position or speed or a start-up friction element adapted to be engaged to establish a power delivery path for the reverse gear position is hydraulically activated by a servo activating hydraulic fluid pressure (line pressure) delivered thereto from the manual valve. Thus, the vehicle becomes ready for start running.

Considering the variation of the idle speed during this select operation by the driver, since the vehicle is at a standstill, there occurs a creep in the torque converter, inducing a load which is applied to the engine, causing a drop in the idling speed of the engine, leading to increased tendency of the engine to stall.

In order to compensate for this undesired drop in idling speed, it has been proposed to increase the amount of intake air in timed with the occurrence of the driver's shifting the manual valve from the neutral range position to the drive range position based on output of an inhibitor switch which is provided to detect which range position the manual valve is placed at.

This proposal is insufficient in that there is a likelihood that the engine speed is increased before the corresponding start-up friction element is hydraulically activated, inducing substantial shock upon actual engagement of the start-up friction element. This is derived from a delay between the instance when the manual valve is shifted to the drive range position and the instance when the servo activating hydraulic pressure is applied to activate the start-up friction elemenmt. This delay is not constant and differs with aging of the component parts of the automatic transmission, temperature of the hydraulic fluid, idling speed, and etc., making it very difficult to increase the engine speed in timed with the actual engagement of the start-up friction element in all circumstances.

An object of the present invention is to improve the above-mentioned compensating system such that the engine torque is increased in timed with the actual engagement of the start-up friction element after the manual valve has been shifted from the neutral range position to the drive range position in all circumstances.

SUMMARY OF THE INVENTION

According to one aspect of the present invention, there is provided a system for compensating for a drop in idling speed of an engine of a drive system of a vehicle, the drive system including an automatic transmission having an output shaft and an input shaft drivingly connected via a torque converter to the engine, the automatic transmission having a control valve assembly including a manual valve shiftable from a neutral range position to a drive range position, the automatic transmission having at least one start-up friction element adapted to be engaged by a servo activating hydraulic fluid pressure when the servo activating hydraulic fluid pressure is allowed to be delivered to the start-up friction element after the manual valve has been shifted to the drive range position from the neutral range position, the system comprising; means for detecting which range position the manual valve is shifted to and generating a range indicative signal indicative of the range position detected, means for detecting the instance when the start-up friction element is brought into engagement after the range indicative signal has changed to indicate a change in range position from the neutral range position to the drive range position and generating a command signal after the instance detected, and means responsive to said command signal for causing the engine to increase an output torque thereof.

According to another aspect of the present invention, there is provided a method of compensating for a drop in idling speed of an engine of a drive system of a vehicle, the drive system including an automatic transmission having an output shaft and an input shaft drivingly connected via a torque converter to the engine, the automatic transmission having a control valve assembly including a manual valve shiftable from a neutral range position to a drive range position, the automatic transmission having at least one start-up friction element adapted to be engaged by a servo activating hydraulic fluid pressure when the servo activating hydraulic fluid pressure is allowed to be delivered to the start-up friction element after the manual valve has been shifted to the drive range position from the neutral range position, the method comprising the steps of, detecting which range position the manual valve is shifted to and generating a range indicative signal indicative of the range position detected, detecting an instance when the start-up friction element is brought into engagement after the range indicative signal has changed to indicate a change in range position from the neutral range position to the drive range position and generating a command signal after the instance detected, and causing the engine to increase an output torque thereof in response to the signal.

BRIEF DESCRIPTION OF THE DRAWINGS

FIG. 1 is a block diagram of a drive system for an automotoive vehicle which a first embodiment of a system according to the present invention is applied to;

DETAILED DESCRIPTION OF THE INVENTION

Figure 1:
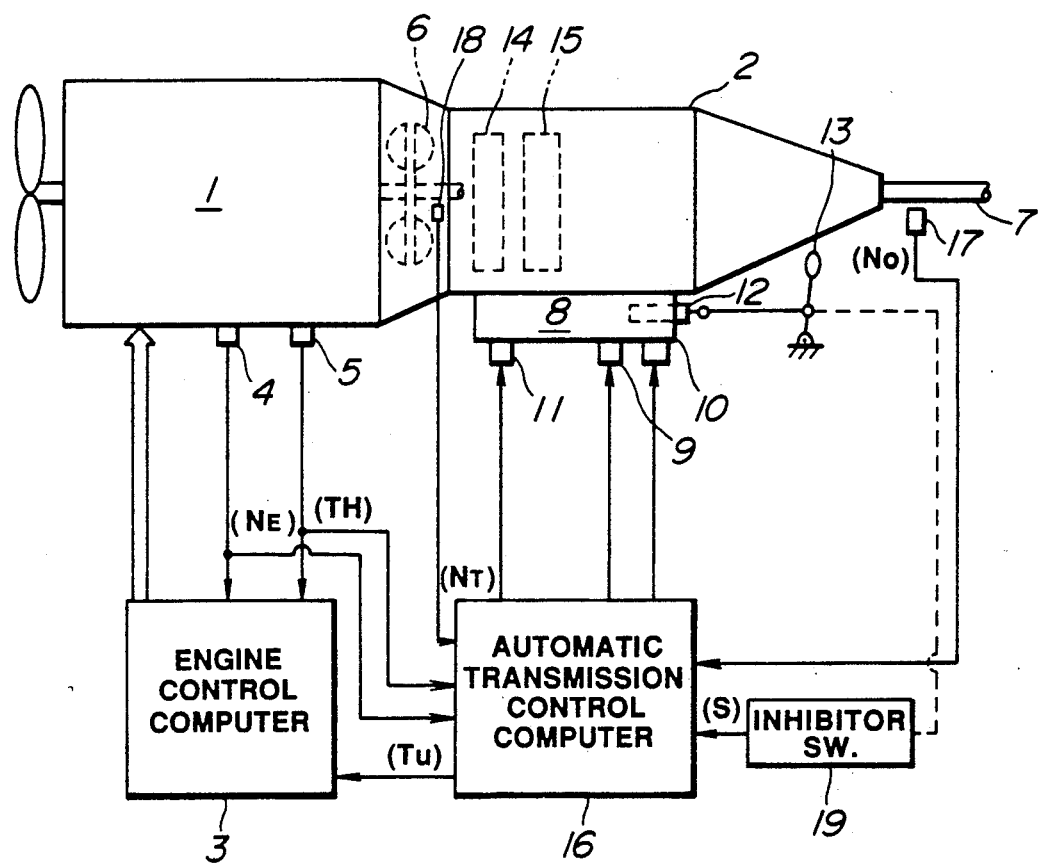

Referring to FIG. 1, the reference numeral 1 designates an internal combustion engine, and the reference numeral 2 an automatic transmission.

The engine 1 is operated under the control of an engine control computer 3 including in the usual a ROM, a RAM, a CPU, and an input/output control circuit, although not shown. The functions of the engine control computer are to determine ignition timing and amount of fuel injection, and thus an engine revolution speed sensor 4 for detecting engine revolution speed $N_E$ and a throttle opening degree sensor 5 for detecting a throttle opening degree TH of the engine throttle valve are provided. The sensor signals are supplied to the engine control computer 3.

The engine 1 is followed by a torque converter 6 which in turn followed by the automatic transmission 2. This automatic transmission is of the RE4R01A type described in "NISSAN FULL-RANGE AUTOMATIC TRANSMISSION RE4R01A TYPE, SERVICE MANUAL, (A261C07)" issued on March, 1987 by NISSAN MOTOR COMPANY LIMITED. The automatic transmission of the this type is also disclosed in Hayasaki U.S. Pat. No. 4,680,992 which is hereby incorporated in its entirety by reference.

The automatic transmission 2 has a control valve assembly 8 including a first shift solenoid 9, a second shift solenoid 10, a line pressure solenoid 11, and a manual valve 12 with a manually operable selector lever 13.

With the selector lever 13, the manual valve 12 is shiftable between the neutral range position such as "N" range and "P" range and the drive range position such as "D" range and "R" range. With the manual valve 12 placed at the neutral range position ("N" range, for example), all of the friction elements are disengaged. When the manual valve 12 is placed at the "R" range for reverse travel, two friction elements, namely, a reverse clutch and a low & reverse brake, among all of the friction elements are hydraulically activated by line pressure the magnitude of which is variable by varying duty which the line pressure solenoid 11 is subjected to. When the manual valve 12 is placed at the "D" range for forward travel, another friction element, namely, a rear clutch among all of the friction elements is hydraulically activated by the line pressure. During operation in this "D" range, the automatic transmission 2 is shiftable between four speeds or gear positions by selectively rendering ON/OFF the first and second shift solenoids 9 and 10 in accordance with a predetermined pattern as illustrated by the following Table 1.

TABLE 1

|  | First Shift Solenoid 9 | Second Shift Solenoid 10 |
| --- | --- | --- |
| First Speed | ON | ON |
| Second Speed | OFF | ON |
| Third Speed | OFF | OFF |
| Fourth Speed | ON | OFF |

ON/OFF control of the shift solenoids 9 and 10 and duty control of the line pressure solenoid 11 are carried out under the control of an automatic transmission control computer 16 which includes in the usual manner a ROM, a RAM, a CPU, and an input/output control circuit, although not shown. The sensor outputs of the engine revolution speed sensor 4 and throttle opening degree sensor 5 are supplied to the automatic transmission control computer 16. A transmission output revolution speed $N_O$ of a transmission output shaft 7 is detected by a transmission output shaft revolution speed sensor 17. A transmission input revolution speed $N_T$, namely a revolution speed of a turbine shaft of the torque converter 6, is detected by a transmission input revolution speed sensor 18. A range position assumed by the manual valve 12 is detected by an inhibitor switch 19. The output S of this inhibitor switch 19 thus is indicative of the range position assumed by the manual valve 12. The output signals of the transmission output revolution speed sensor 17, transmission input revolution speed sensor 18 and the output S of the inhibitor switch 19 are also supplied to the automatic transmission control computer 16. The automatic transmission control computer 16 performs a shift control via selective operation of the shift solenoids 9 and 10, and a line pressure control via adjustment of duty of the line pressure solenoid 11. It also generates a torque-up signal $T_U$. This torque-up signal $T_U$ is supplied to the engine control computer 3, inducing an increase in the amount of intake air supplied to the engine cylinders to urge the engine 1 to increase its revolution speed so as to compensate for a drop in engine revolution speed owing to application of load when the manual selector valve 12 is shifted from the neutral range position to the drive range position.

The last mentioned function performed is hereinafter described along with flowcharts shown in FIGS. 2, 3 and 4.

Figure 2:
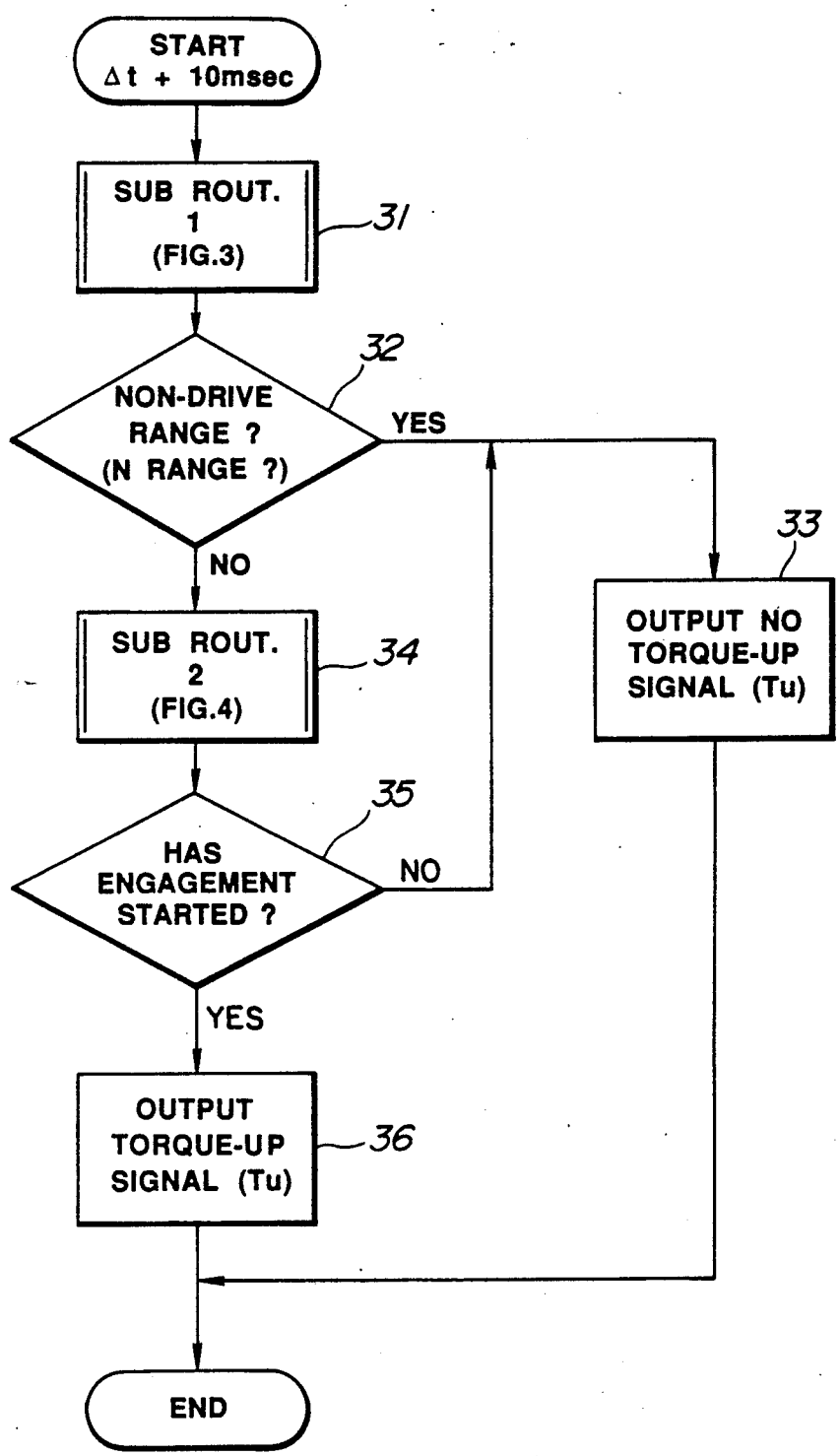
FIGS. 2 to 4 are flowcharts of a control program stored in a read only memory (ROM) of a microcomputer based control unit.
Figure 3:
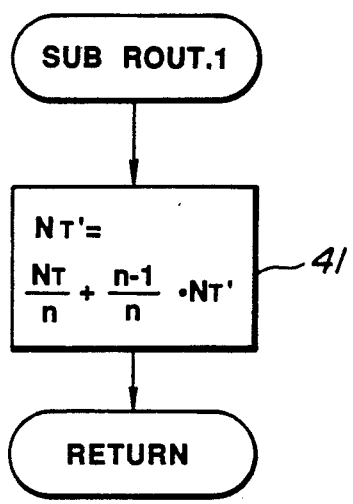

FIG. 2 shows a main routine which is executed upon elapse of a computing cycle t (delta t) of 10 msec. At a step 31, a sub-routine 1 is executed. This sub-routine 1 is illustrated in FIG. 3. Referring to FIG. 3, at a step 41, the CPU of the automatic transmission control computer 16 determines a running average $N_T'$ of the transmission input revolution $N_T$ by calculating the following equation:

$$N_T' = N_T/n + (n-1)N_T'/n,$$

where: n represents the number of sampling.

Figure 5:
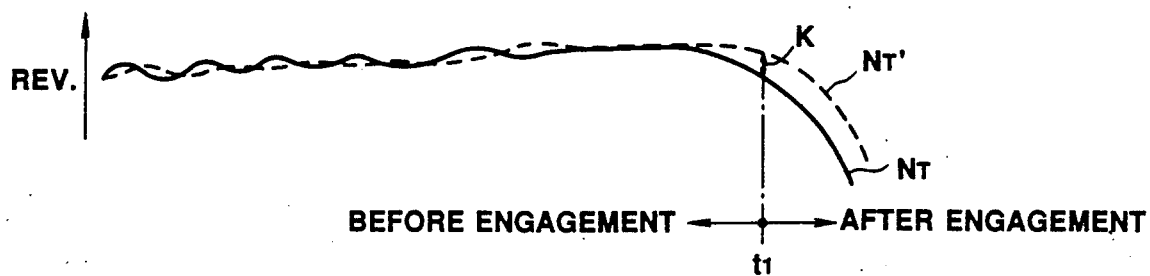
FIG. 5 is a time chart showing the variation of the transmission input revolution speed and the variation of the running average.

FIG. 5 shows the variation of the transmission input revolution speed $N_T$ in relation to the variation of the running average $N_T'$ thereof after the manual valve 12 has been shifted from the neutral range position to the drive range position. From this time chart, it has been confirmed that the deviation of $N_T$ from $N_T'$, i.e., $N_T' - N_T$, becomes greater than a predetermined value K at the instance $t_1$ when the start-up friction element is brought into engagement. Thus, it is decided that the start-up friction element has been brought into the engagement when the deviation $N_T' - N_T$ becomes greater than or equal to the predetermined value K.

Turning back to FIG. 2, at a step 32, a judgement is made based on the information indicated by the output signal S of the inhibitor switch 19 whether or the neutral range position ("N" range) is selected by the manual valve 12 or not. When "N" range is selected, the program proceeds to a step 33 where no torque-up signal $T_U$ is generated.

Figure 4:
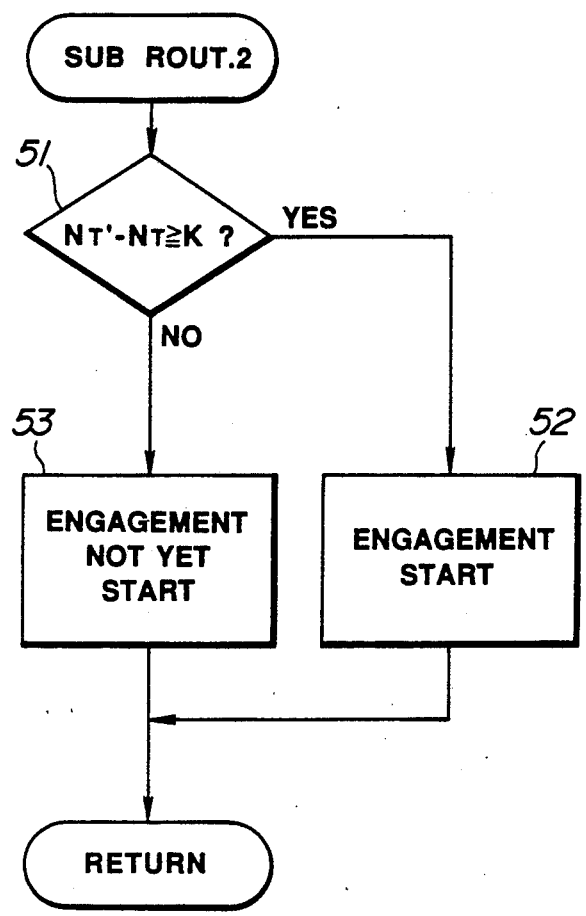

After the the manual valve 12 has been shifted from "N" range position to one of the drive range positions, such as, "D" range, the judgement made at the step 32 turns out to be NO, so that the program proceeds to a step 34 where a sub-routine 2 shown in FIG. 4 is executed.

Referring to FIG. 4, at a step 51, a judgement is made whether or not the deviation $N_T' - N_T$ obtained at the previous step 31 is greater than or equal to the predetermined value K. If the answer to this enquiry at the step 51 is YES, it is set at a step 52 that the start-up friction element has been brought into engagement. On the contrary, if the answer is NO, it is set at a step 53 that the start-up friction element has not been brought into engagement yet.

Turning back to FIG. 2, at a step 35, a judgement is made based on the result of execution the sub-routine 2 shown in FIG. 4 whether or not the start-up friction element has been brought into engagement. When the answer to the enquiry at the step 35 is YES, the torque-up signal $T_U$ is generated at a step 36, whereas when the answer is NO, the torque-up signal $T_U$ is not generated at the step 33.

This torque-up signal $T_U$ is supplied to the engine control computer 3. Upon receiving the torque-up signal $T_U$, the engine control computer 3 instructs an increase in the amount of intake air supplied to the engine 1, causing the same to to increase its engine revolution speed, inducing an increase in engine output torque.

From the preceding description, it will now be understood that the increase in engine revolution speed occurs in time in with the instance when the start-up friction element is brought into engagement after the manual valve 12 has been shifted from the neutral range position to the drive range position since the instance when the start-up friction element is brought into engagement is detected based on the result of comparison of the deviation $N_T' - N_T$ with the predetermined value K. Thus, even if a delay from the instance when the manual valve 12 is shifted from the neutral range position to the drive range position till the subsequent instance when the start-up friction element is brought into engagement differs in accordance with different circumstances, the increase in engine revolution speed occurs in time with the instance when the start-up friction element is brought into engagement after the manual valve 12 has been shifted from the neutral range position to the drive range position.

Figure 6:
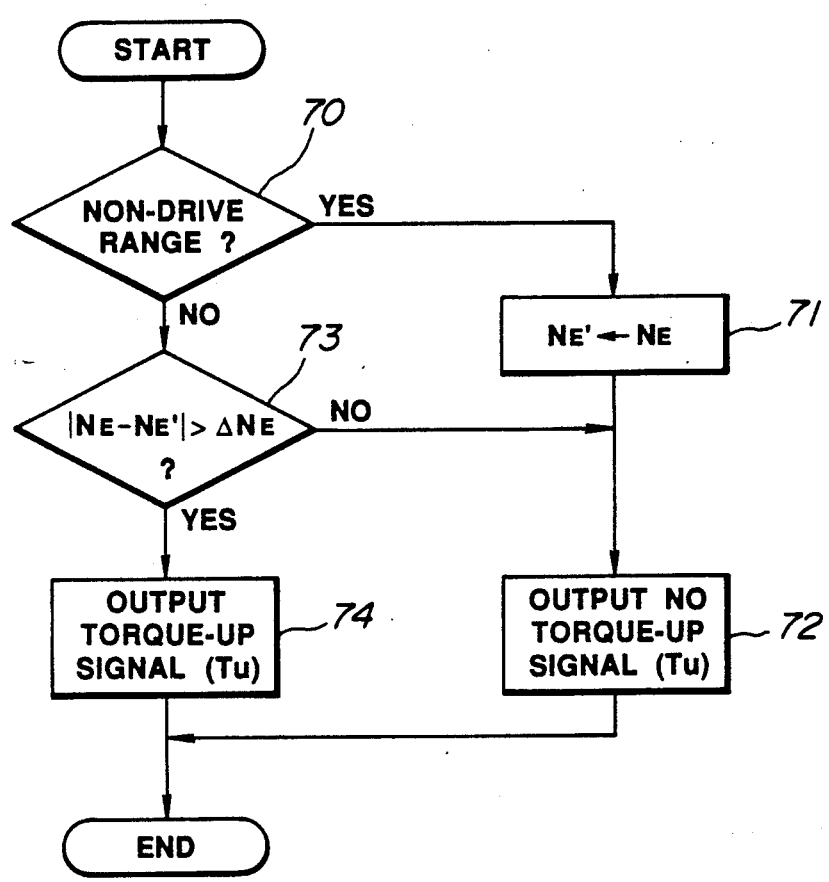
FIGS. 6 and 7 are flowcharts of two alternative versions of the flowchart shown in FIG. 2.
Figure 7:
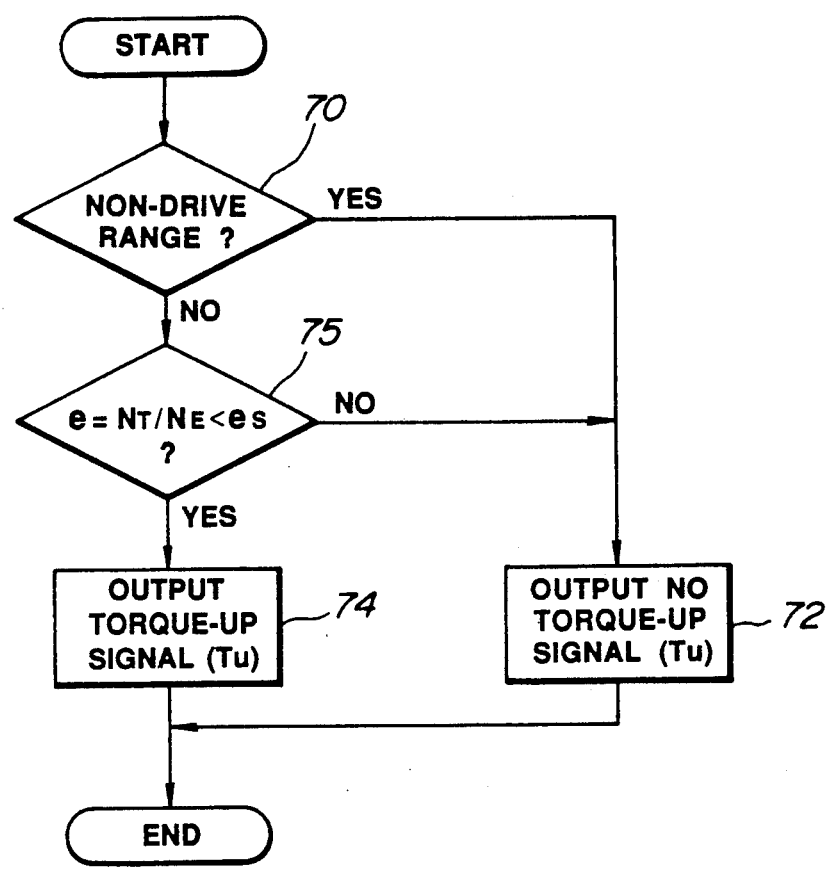

An an alternative to the detecting method illustrated in the flowchart shown in FIG. 2, the initiation instance of engagement of the start-up friction element may be determined by detecting a change in engine revolution speed $N_E$ or transmission input revolution speed $N_T$ as illustrated in FIG. 6 or by detecting a change in speed ratio ($=N_E/N_T$) in the torque converter as illustrated in FIG. 7.

Referring to FIG. 6, a judgement is made at a step 70 whether the manual valve is placed at the non-drive range, namely "N" range, or not. Assuming now that the "N" range is kept selected, the actual engine revolution speed $N_E$ is set as $N_E$, at a step 71 and no torque-up signal is generated at a step 72 as long as the inquiry at the step 70 continues to be affirmative. Considering now that the manual valve has been shifted from "N" range to "D" range, since the inquiry at the step 70 becomes negative, the program proceeds to a judgement step 73 where the actual engine revolution speed $N_E$ is compared with the content of $N_E$, which represents an engine revolution speed immediately before the manual valve is shifted from the "N" range to "D" range, in order to determine whether the engine revolution speed has changed by a predetermined value $N_E$ (delta $N)_{WE}$ or not. It is defined that the engagement of start-up friction element has initiated when the absoulte difference between $N_E$ and $N_E$, becomes greater than $N_E$. Thus, if the answer to the inquiry at the step 73 becomes affirmative, the torque-up signal $T_U$ is generated at a step 74, causing the increase in idling speed to take place concurrently with the initiation of engagement of the start-up friction element. If the answer to the inquiry at the step 73 is negative, the program proceeds to the step 72.

Similar change is observed in the transmission input revolution speed $N_T$ upon engagement of the start-up friction element. Thus, replacing $N_E$ and $N_E$, with $N_T$ and $N_T$, in the flowchart shown in FIG. 6, it is possible to use the change in the transmission input revolution speed $N_T$ in determining whether the start-up friction element is brought into engagement or not.

Referring to FIG. 7, this flowchart is different from the flowchart shown in FIG. 6 only in that a new judgement step 75 has replaced the two steps 71 and 73. At this new judgement step 75, it is determined whether the speed ratio e ($=N_T/N_E$) becomes less than a predetermined value $e_s$ or not. It is defined that the speed ratio e becomes less than the predetermined value $e_s$ upon engagement of the start-up friction element after the manual valve has been shifted from the "N" range to "D" range.

Another alternative is to detect the servo activating hydraulic fluid pressure delivered to the start-up friction element by a pressure sensor since this pressure changes upon engagement of the start-up friction element.

In the preceding description, the amount of intake air is increased in response to the torque-up signal $T_U$. Alternatively, the amount of fuel-injection may be increased or the ignition timing may be advanced.

What is claimed is:

1. A system for compensating for a drop in idling speed of an engine of a drive system of a vehicle, the drive system including an automatic transmission having an output shaft and an input shaft drivingly connected via a torque converter to the engine, the automatic transmission having a control valve assembly including a manual valve shiftable from a neutral range position to a drive range position, the automatic transmission having at least one start-up friction element adapted to be engaged by a servo activating hydraulic fluid pressure when the servo activating hydraulic fluid pressure is allowed to be delivered to the start-up friction element after the manual valve has been shifted to the drive range position from the neutral range position, the system comprising:

means for detecting which range position the manual valve is shifted to and generating a range indicative signal indicative of the range position detected;

means for detecting an instance when the start-up friction element is brought into engagement after said range indicative signal has changed to indicate a change in range position from the neutral range position to the drive range position and generating a command signal after the instance detected; and means responsive to said command signal for causing the engine to increase an output torque thereof.

2. A system as claimed in claim 1, wherein said means for detecting the instance when the start-up friction element is brought into engagement include transmission input revolution speed sensor means for detecting a revolution speed of the input shaft of the automatic transmission and generating a transmission input revolution speed indicative signal, means for deriving a running average of said transmission input revolution speed indicative signal, and means for comparing said transmission input revolution speed indicative signal with said running average.

3. A system as claimed in claim 1, wherein said means for detecting the instance when the start-up friction element is brought into engagement include engine revolution speed sensor means for detecting a revolution speed of the engine and generating an engine revolution speed indicative signal, and means for comparing said engine revolution speed indicative signal with a value taken by said engine revolution speed indicative signal when said range indicative signal has changed to indicate said change in range position from the neutral range position to the drive range position.

4. A system as claimed in claim 1, wherein said means for detecting the instance when the start-up friction element is brought into engagement include engine revolution speed sensor means for detecting a revolution speed of the engine and generating an engine revolution speed indicative signal, transmission input revolution speed sensor means for detecting a revolution speed of the input shaft of the automatic transsmission and generating a transmission input revolution speed indicative signal, and means for evaluating a ratio of said transmission input revolution speed indicative signal to said engine revolution speed indicative signal.

5. A method of compensating for a drop in idling speed of an engine of a drive system of a vehicle, the drive system including an automatic transmission having an output shaft and an input shaft drivingly connected via a torque converter to the engine, the automatic transmission having a control valve assembly including a manual valve shiftable from a neutral range position to a drive range position, the automatic transmission having at least one start-up friction element adapted to be engaged by a servo activating hydraulic fluid pressure when the servo activating hydraulic fluid pressure is allowed to be delivered to the start-up friction element after the manual valve has been shifted to the drive range position from an neutral range position, the method comprising the steps of:

detecting which range position the manual valve is shifted to and generating a range indicative signal indicative of the range position detected;

detecting the instance when the start-up friction element is brought into engagement after said range indicative signal has changed to indicate a change in range position from the neutral range position to the drive range position and generating a command signal after the instance detected; and causing the engine to increase an output torque thereof in response to said command signal.

6. A method as claimed in claim 5, wherein said step of detecting the instance when the start-up friction element is brought into engagement include a step of detecting a revolution speed of the input shaft of the automatic transmission and generating a transmission input revolution speed indicative signal, a step of deriving a running average of said transmission input revolution speed indicative signal, and a step of comparing said transmission input revolution speed indicative signal with said running average.

7. A method as claimed in claim 5, wherein said step of detecting the instance when the start-up friction element is brought into, engagement include a step of detecting a revolution speed of the engine and generating an engine revolution speed indicative signal, and a step of comparing said engine revolution speed indicative signal with a value taken by said engine revolution speed indicative signal when said range indicative signal has changed to indicate said change in range position from the neutral range position to the drive range position.

8. A method as claimed in claim 5, wherein said step of detecting the instance when the start-up friction element is brought into engagement include a step of detecting a revolution speed of the engine and generating an engine revolution speed indicative signal, a step of detecting a revolution speed of the input shaft of the automatic transsmission and generating a transmission input revolution speed indicative signal, and a step of evaluating a ratio of said transmission input revolution speed indicative signal to said engine revolution speed indicative signal.

* * * * *